(No Model.)
O. R. GOTTWALD.
HARNESS FOR OXEN OR OTHER CATTLE.
No. 432,400. Patented July 15, 1890.
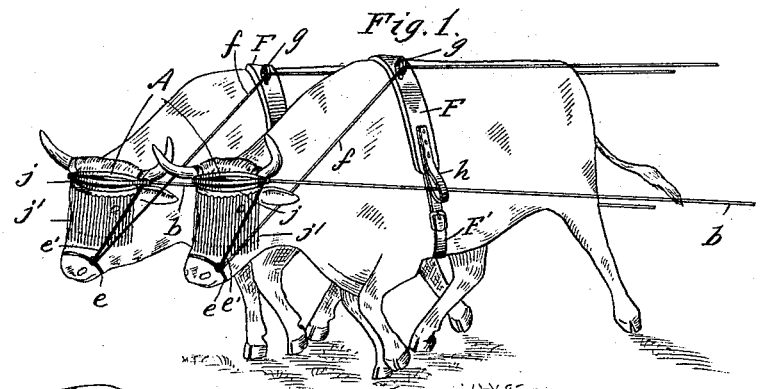
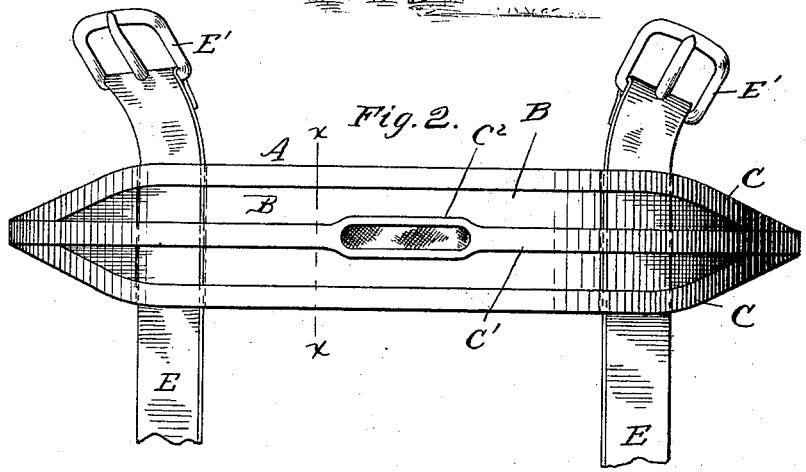
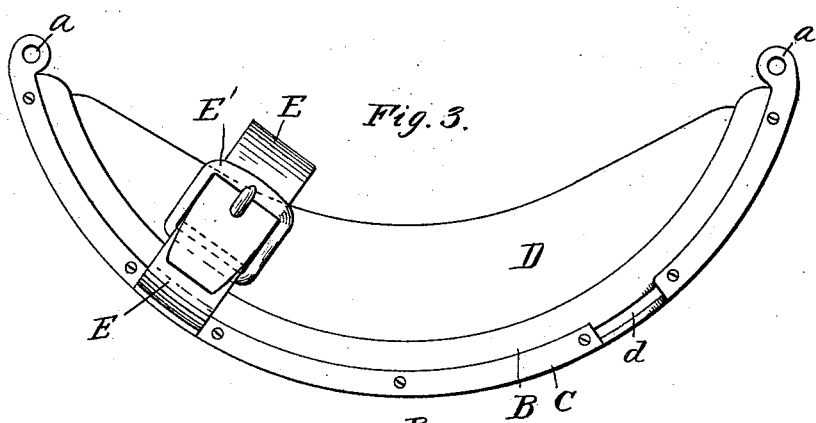
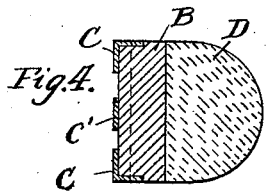
WITNESSES:
J. Henry Thebenath
C. Sedgwick
INVENTOR:
O. R. Gottwald
BY
Munn & Co.
ATTORNEYS

UNITED STATES PATENT OFFICE.

OTTO R. GOTTWALD, OF SAYVILLE, NEW YORK.

HARNESS FOR OXEN OR OTHER CATTLE.

SPECIFICATION forming part of Letters Patent No. 432,400, dated July 15, 1890.

Application filed April 23, 1890. Serial No. 349,098. (No model.)

*To all whom it may concern:*

Be it known that I, OTTO R. GOTTWALD, of Sayville, in the county of Suffolk and State of New York, have invented a new and Improved Harness for Oxen or other Cattle, of which the following is a full, clear, and exact description.

My invention relates to improvements in harnesses for oxen and other working cattle; and the object of my invention is to produce a simple and easy harness that may be easily applied to the animal, that will not restrict the movement of the animal, and by means of which a much greater load can be drawn than when the devices ordinarily in use are used.

To this end my invention consists in a harness constructed substantially as hereinafter described and claimed.

Reference is to be had to the accompanying drawings, forming a part of this specification, in which similar letters of reference indicate corresponding parts in all the figures.

Figure 1 is a perspective view of a pair of oxen provided with a harness embodying my invention. Fig. 2 is an enlarged front elevation of the head-piece of the harness. Fig. 3 is a plan view of the same with one of the attaching-straps removed, and Fig. 4 is a transverse section on the line $x$ $x$ of Fig. 2.

The head-piece A is adapted to fit upon the head of the animal and below the horns, said piece being formed of a strip of tough wood B bent into the desired shape, an angular metal strip or binding C, attached to the front portion of the wooden strip B, and an inner cushion D, adapted for engagement with the head of the animal.

The strips C have projecting flanges which overlap the wooden portion D, a central strengthening-rib C′, having an enlarged central portion C², which may be ornamented, if desired, and the ends of the strips are formed into eyes $a$, to which the traces $b$ are attached. The strips C can be made so strong that the central rib C′ is not needed and can be left out, if desired. The cushion D is attached to the wooden portion B in any suitable manner, and may be formed of leather, canvas, or other material, and should be stuffed with material that will make it easy for the animal's head. The overlapping flanges of the strips C are cut away at points where the straps E are attached, and a slot $d$ is formed between the said strips and the wooden portion B for the passage of said straps E. The straps E are provided with suitable buckles E′ and are adapted for attachment to the horns of the animal, thus holding the head-piece A in a proper position. A strap $e$ encircles the muzzle of the animal, said strap forming a part of the animal's halter. Attached to suitable rings upon said straps E are the guiding-lines $f$, which extend through the terrets $g$ of the saddle F, and by which the course of the animal is guided.

The saddle F may be made of leather, canvas, or other material, is provided with a suitable belly-girth F′, and attached to the sides of the saddle are the loops $h$, through which the traces $b$ extend. The loops $h$ will thus hold the traces $b$ in position and prevent the animal from getting his feet over the same. Instead of having one loop upon a side of the saddle, a small strap with a ring, a chain with a ring, a strap with a double ring, or any desired form of lug may be substituted.

I do not confine myself to the exact construction of the head-piece A, as it is evident that it is only necessary that the same should be easy to the head of the animal, should have sufficient strength, should have an easy means of adjustment.

From the foregoing description it will be seen that the animal will be unencumbered by the harness, and that therefore he will be enabled to pull a much greater load than when an ordinary yoke is used.

A strip of cloth or leather $j$ will be attached to the head-piece A, said strip having a depending fringe $j'$, which will cover the face of the animal and serve to keep off the flies.

Having thus fully described my invention, I claim as new and desire to secure by Letters Patent—

1. A harness for cattle, consisting, essentially, of a head-piece adapted to fit the head and provided with straps by which the same may be attached to the horns of the animal, a saddle with a belly-girth adapted for attachment to the body of the animal and provided with loops upon its side, and traces attached to the ends of the head-piece and extending through the said loops, substantially as described.

2. In a harness for cattle, a head-piece consisting, essentially, of a wooden strip shaped to fit the head, an inner cushion for engagement with the head, and metal strengthening-pieces attached to the front of the said strip, provided with terminal eyes, suitable straps attached to said head-piece and adapted to be buckled about the horns of the animal, and suitable traces attached to the terminal eyes, substantially as described, and for the purpose specified.

3. In a harness for cattle, the combination, with a head-piece shaped to fit the head of an animal, said head-piece having suitable straps for attaching it to the horns of the animal and having suitable traces attached thereto, of a strap connected with the head-piece and adapted to encircle the animal's muzzle and guiding-lines attached to said muzzle-strap, substantially as described.

OTTO R. GOTTWALD.

Witnesses:
WILMOT M. SMITH,
JNO. G. GOTTWALD.